United States Patent
Evers et al.

(10) Patent No.: US 11,734,011 B1
(45) Date of Patent: Aug. 22, 2023

(54) CONTEXT PARTITIONING OF BRANCH PREDICTION STRUCTURES

(71) Applicant: ADVANCED MICRO DEVICES, INC., Santa Clara, CA (US)

(72) Inventors: Marius Evers, Sunnyvale, CA (US); David Kaplan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 369 days.

(21) Appl. No.: 15/968,389

(22) Filed: May 1, 2018

(51) Int. Cl.
*G06F 9/38* (2018.01)
*G06F 9/30* (2018.01)
*G06F 9/455* (2018.01)

(52) U.S. Cl.
CPC .......... *G06F 9/3806* (2013.01); *G06F 9/30058* (2013.01); *G06F 9/45558* (2013.01); *G06F 2009/45591* (2013.01)

(58) Field of Classification Search
CPC ........................... G06F 9/3806; G06F 9/30058
See application file for complete search history.

(56) References Cited

U.S. PATENT DOCUMENTS

| 2015/0123980 | A1* | 5/2015 | Nalluri et al. | G06T 1/20 345/522 |
| 2015/0268957 | A1* | 9/2015 | Bonanno et al. | G06F 9/3806 712/239 |
| 2019/0266000 | A1* | 8/2019 | Tsirkin et al. | G06F 9/5077 |

OTHER PUBLICATIONS

Wikipedia; "Logic Gate"; Dec. 25, 2016 (Year: 2016).*

* cited by examiner

*Primary Examiner* — William B Partridge

(57) ABSTRACT

A processor core executes a first process. The first process is associated with a first context tag that is generated based on context information controlled by an operating system or hypervisor of the processing system. A branch prediction structure selectively provides the processor core with access to an entry in the branch prediction structure based on the first context tag and a second context tag associated with the entry. The branch prediction structure selectively provides the processor core with access to the entry in response to the first process executing a branch instruction. Tagging entries in the branch prediction structure reduces, or eliminates, aliasing between information used to predict branches taken by different processes at a branch instruction.

36 Claims, 7 Drawing Sheets

CONTEXT PARTITIONING OF BRANCH PREDICTION STRUCTURES

BACKGROUND

Processors use branch prediction to guess the outcome of a branch instruction so that the processing unit begins speculatively executing subsequent instructions along the predicted branch before the processing unit has evaluated the branch instruction. The processing unit uses information in a branch prediction structure to predict the outcome of the branch instruction. For example, the processing unit can predict the outcome of conditional branch instructions that implement software constructs such as if-then-else and case statements. Examples of branch prediction structures include indirect branch predictors that are able to redirect the flow of the program to an arbitrary instruction, a return address stack that includes return addresses for subroutines executing on the processing unit, and a branch target buffer that includes information for predicting the presence and target addresses of branch instructions. Some implementations of branch prediction structures use a branch history of results of branch instructions executed by processes that were previously, or are currently, executing on the processing unit as part of the prediction algorithm. For example, in a very simple branch prediction mechanism, if a branch instruction previously directed the program flow to a first address 90% of the time and a second address 10% of the time, a corresponding entry in the branch prediction structure predicts that the branch instruction will direct the program flow to the first address, thereby allowing the process to speculatively execute instructions along the branch beginning at the first address without waiting for evaluation of the branch instruction. If the predicted branch turns out to be incorrect when the branch instruction is evaluated, speculative execution along the incorrectly predicted branch is suspended and the state of the processing unit is rolled back to the state at the branch instruction to begin executing along the correct branch.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1A:
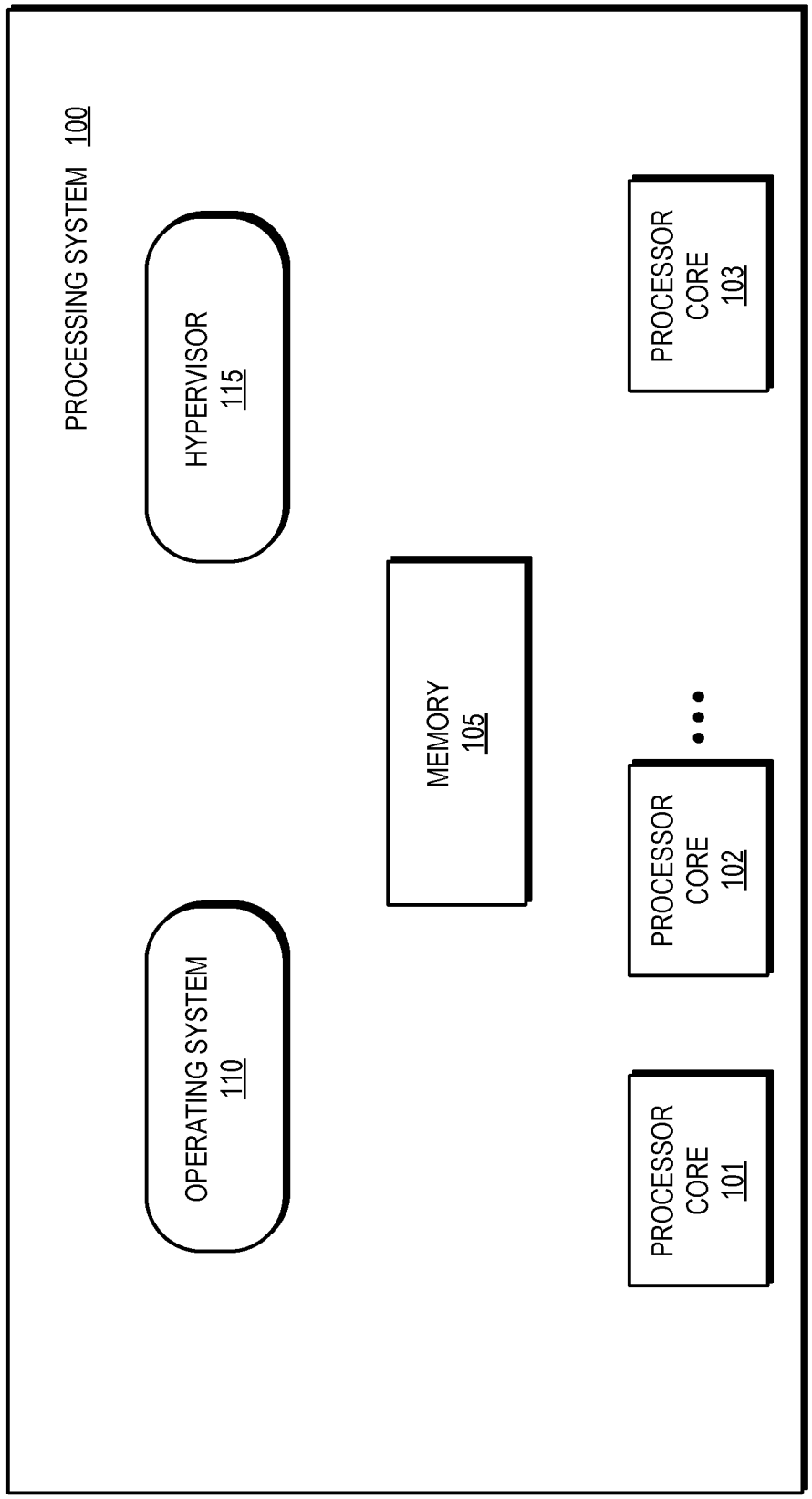
FIG. 1A is a block diagram of a processing system that implements context partitioning of branch prediction structures according to some embodiments.

Branch instructions encountered by a process executing on a processor are identified by a physical address of the branch instruction, a virtual address of the branch instruction, or an address otherwise associated with the branch instruction such as the virtual or physical address of the cache line it resides in. The process is associated with a thread identifier that indicates a physical hardware thread that is assigned to execute the process. Branch predictors identify the prediction information for a branch instruction using a subset of the information representing the address and the thread identifier. For example, a branch predictor identifies branch prediction information for a branch instruction using a hashed value of portions of one or more of a virtual address, a physical address, and a thread identifier. Aliasing occurs when the branch predictor derives the same information to identify branch prediction information for different branch instructions in the same process or for branch instructions in different processes. For example, if a subset of the bits in a virtual address is used to identify entries in the branch prediction structure, all branch instructions that share the subset of bits are aliased to the same entries, even though the complete virtual addresses of the branch instructions are different. For another example, there is a small, but non-zero, probability that the hashed values are the same for different branch instructions or branch instructions in different processes because a hash function uses less information to represent the address and the thread identifier. Inadvertent aliasing is referred to as interference and can decrease the accuracy of branch prediction because the probability of taking different branches at a branch instruction is different for the aliased processes.

Processes run in different contexts. In some cases, a context is defined by characteristics of the process such as a privilege level of the process, an indication of whether the process is a guest or a hypervisor in a virtual machine, a base address of a page table allocated to the process, a virtual machine identifier, a process context identifier, a logical processor identifier (e.g., an identifier of a hardware thread that is executing the process) for processors that support multi-threading, and the like. Access permissions set in the page tables allocated to different processes typically prevent processes operating in different contexts from accessing each other's protected data. However, intentional aliasing in the branch predictor could be exploited to expose data for a process operating in a first context to a malicious process operating in a second context. Intentional aliasing can also be used to infer secure information about branches that belong to a different context.

FIGS. 1-6 disclose techniques for reducing, or eliminating, aliasing between information used to predict branches taken by different processes at a branch instruction by tagging entries in branch prediction structures using information indicating an address of the branch instruction and context of the processes associated with the entries. The context of a process includes information that differentiates the process from other processes. The context information is controlled by the operating system (OS) or hypervisor and therefore is difficult to fake or alias by the other processes. Examples of information that define a context for a process include information indicating a privilege level for the process such as a user mode and a supervisor mode, information indicating whether the process is a guest or a hypervisor for a virtual machine, an address space identifier (ASID) that indicates a memory space associated with a virtual machine, a process context identifier (PCID), or a base address (CR3) of a page table associated with the process. The ASID, the PCID, and the CR3 are names that are defined in accordance with the AMD64 instruction set. Different names are used for similar identifiers in other instruction sets.

A context tag for an entry in a branch prediction structure includes a set of bits derived from the context of the corresponding process. Some embodiments of the context tag are formed using bits that represent the privilege level for the process (e.g., user or supervisor mode), whether the process is a guest or a hypervisor, and a thread identifier of a hardware thread that is executing the process, as well as a valid bit. The hardware thread (e.g., a processor core that is executing the process) is only allowed to access an entry in the branch prediction structure if a value of the context tag generated using context information for the process matches the context tag used to tag the entry. This approach prevents software from gaining access to the branch prediction structure to cause aliasing between user processes and supervisor processes and aliasing between guest processes and hypervisor processes. However, this type of context tag does not protect against inadvertent or intentional aliasing between processes operating at the same privilege level or in the same virtual mode, e.g., two user processes or two guest processes. Some embodiments of the branch predictor structures are therefore flushed in response to a context switch between two user processes or a world switch between two guest processes on a virtual machine. In some embodiments, the entire branch predictor structure is flushed and, in other embodiments, only the affected entries in the branch predictor structure are flushed. An operating system triggers a flush using a dedicated instruction or using a write to a machine specific register (MSR). In some embodiments, only prediction structures that predict target addresses are tagged with a context tag.

In some embodiments, the context tags for entries in the branch prediction structures are stored in a context remapper that includes a table to map context information (or a subset thereof) to the context tags. A large amount, or even all, of the available context information is mapped to a smaller context tag. In some cases, more than 100 bits of context information is mapped to a context tag that is represented by a few bits. Entries in the branch prediction structures are tagged using context tags generated based on the context information of the processes that are used to generate the branch prediction information in the entries, thus saving storage space in the branch prediction structures. When the context information for an executing process is changed, the new context information for the process is compared to context information stored in the context remapper. In response to a match, the context tag associated with the matching context information is stored as the current context tag. If none of the context information for entries in the context remapper match the context information of the executing process, a new entry is allocated and the context information of the executing process is mapped to that new context tag, which is then stored as the current context tag. If the context tag for the newly allocated entry was previously used, entries in the branch prediction structure that were tagged with the context tag are invalidated. Previous entries in the context remapper are evicted based on a replacement policy if all of the context tags have been allocated. When an executing process reaches a branch instruction, the processor that is executing the process is only allowed to access an entry in the branch prediction structure if a value of the current context tag for the process matches the context tag used to tag the entry.

FIG. 1A is a block diagram of a processing system 100 that implements context partitioning of branch prediction structures according to some embodiments. The processing system 100 implements one or more processor cores 101, 102, 103, which are collectively referred to herein as "the processor cores 101-103." The processor cores 101-103 are configured to execute instructions that are stored in a memory 105. Some embodiments of the memory are implemented as dynamic random access memory (DRAM). The processor cores 101-103 access the instructions using physical addresses, virtual addresses, or addresses of cache lines in embodiments that implement caching of instructions in a cache (not shown in FIG. 1). Results of the instructions executed by the processor cores 101-103 are stored in the memory 105. The processor cores 101-103 execute instructions sequentially, concurrently, or in parallel with each other. The privilege level of a process executing on one of the processor cores 101-103, the guest/hypervisor status of the process and other context state are known and controlled by an operating system (OS) 110 for the processing system 100 or a hypervisor 115 of one or more virtual machines that are executing in the processing system 100.

Figure 1B:
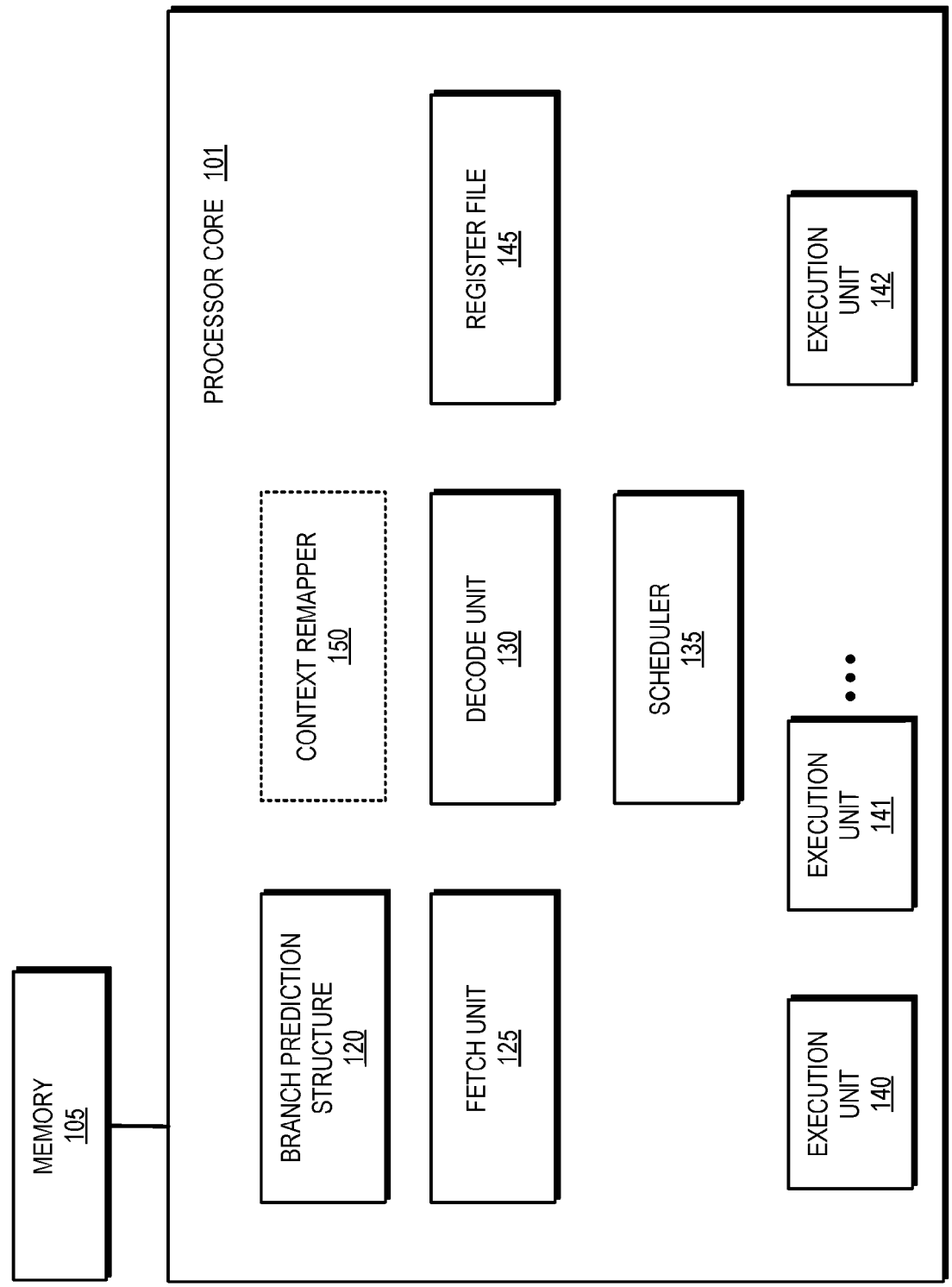
FIG. 1B is a block diagram of a processor core implemented in the processing system shown in FIG. 1B according to some embodiments.

FIG. 1B is a block diagram of the processor core 101 implemented in the processing system 100 according to some embodiments. The processor core 101 also represents one or more of the processor cores 102 and 103 shown in FIG. 1A. The processor core 101 includes a branch prediction unit 120 that provides addresses of locations in the memory 105 to a fetch unit 125. The fetch unit 125 reads the bytes representing the instructions from cache or memory 105 and sends the instruction to a decode unit 130. The decode unit 130 examines the instruction bytes and determines the function of the instruction. The decode unit 130 translates (i.e., decodes) the instruction to generate a series of operations that are to be performed by the processor core 101. These operations are written to a scheduler 135. The scheduler 135 determines when source values for an operation are ready and sends the source values to one or more execution units 140, 141, 142, which are collectively referred to herein as "the execution units 140-142," to perform the operation. The result is written back to a register file 145.

Some embodiments of the branch prediction structure 120 include entries associated with the branch instructions that have been previously executed by the current process or a process that previously executed on the processor core 101. Branch prediction information stored in each entry of the branch prediction structure 120 indicates a likelihood that the branch instruction directs the program flow to an address of an instruction. The processor cores 101-103 access the entries in the branch prediction structure 120 based on an address of the corresponding branch instruction. For example, the values of the bits (or a subset thereof) that represent a physical address, a virtual address, or a cache line address of the branch instruction is used as an index into the branch prediction structure 120. For another example, hashed values of the bits (or a subset thereof) is used as the index into the branch prediction structure 120. Examples of branch prediction structures include an indirect branch predictor, a return address stack, a branch target buffer, a conditional branch predictor, a branch history, or any other predictor structure that is used to store the branch prediction information.

Context partitioning of the branch prediction structure 120 is provided by tagging the entries in the branch prediction structure 120 with tags that are generated based on context information for processes that are used to generate the branch prediction information in the corresponding entries. In some embodiments, a tag for an entry in the branch prediction structure 120 is generated by concatenating one or more bits representative of a privilege level of the process that executed the branch instruction, a bit indicating whether the process was a guest process or a hypervisor process, and a thread identifier that identifies a hardware thread that was executing the process. Some embodiments of the processor core 101 are therefore capable of processing multiple hardware threads concurrently using the shared branch prediction structure 120. For example, the tag can include one bit to indicate whether the processor is a user or supervisor process, one bit to indicate whether the process is a guest or hypervisor process, and a set of bits to identify the hardware thread. The tags are assigned by hardware and consequently the tags cannot be faked or aliased by software (e.g. processes) executing in the processing system 100. Branch prediction information for processes executing in different contexts are therefore partitioned from each other by tagging the corresponding entries in the branch prediction structure 120.

Some embodiments of the processor core 101 implement an optional structure that is referred to herein as a context remapper 150, which is used to map context information to context tags for the branch prediction structure 120. The context remapper 150 supports context partitioning at finer granularity levels by allowing large amounts of context information to be mapped to comparatively smaller context tags, which are then used to tag entries in the branch prediction structure. For example, context information for a process can include information indicating a privilege level of the process, whether the process is a guest process or a hypervisor process, an address space identifier (ASID) that indicates a memory space associated with a virtual machine that is executing the process, a process context identifier (PCID) of the process, a base address (CR3) of a page table associated with the process, and a thread identifier that identifies a hardware thread executing the process. The context information can therefore include tens or hundreds of bits. The context remapper 150 maps the context information to context tags that include smaller numbers of bits, e.g., 3-10 bits. The context tags are then used to tag entries in the branch prediction structure 120 that correspond to the context information that is mapped to the context tag.

A scheduler 135 schedules execution of the instructions by the processor core 101. Some embodiments of the scheduler 135 are configured to perform speculative execution of instructions following a branch instruction that redirects the program flow to an instruction at an address in the memory 105 (or related cache) that is indicated by the branch instruction. Branch instructions include conditional branch instructions that redirect the program flow to an address dependent upon whether a particular condition is true or false. For example, conditional branch instructions are used to implement software constructs such as if-then-else and case statements. Branch instructions also include unconditional branch instructions that always redirect the program flow to an address indicated by the instruction. For example, a JMP instruction always jumps to an address indicated by the instruction. In some cases, the target address is provided in a register or memory location so the target can be different each time the branch is executed. Such branches are called indirect branches.

The branch prediction structure 120 uses the returned branch prediction information to predict a destination address for the branch instruction. The processor core 101 is then able to fetch, decode, and speculatively execute an instruction at the destination address, as well as subsequent instructions along the predicted branch of the program flow. If the predicted branch turns out to be incorrect when the branch instruction is evaluated, speculative execution along the incorrectly predicted branch is suspended and the state of the processor core 101 is rolled back to the state at the branch instruction to begin executing along the correct branch. Techniques for implementing speculative execution of instructions based on predicted outcomes of a branch instruction are known in the art and, in the interest of clarity, are not discussed in further detail herein.

In operation, e.g., when a process is executing or is scheduled to execute on the processor core 101, the processing system 100 generates a context tag for the process based, at least in part, on context information that is controlled by the operating system 110 or the hypervisor 115. In response to the process encountering a branch instruction in the program flow, the context tag associated with the process is compared to context tags of entries in the branch prediction structure 120 that are indexed by the address of the branch instruction. The branch prediction structure 120 then selectively allows the processor core 101 to access the entries that are indexed by the branch instruction address based on the results of the comparison. The processor core 101 is then able to use the information in the entries to facilitate execution of the process. The branch prediction structure 120 denies access to the entries in response to the context tag of the process differing from the context tag that is used to tag the entries. The branch prediction structure 120 allows access to the entries and returns the branch prediction information from the entry in response to the context tag of the process matching the context tag that is used to tag the entries.

Figure 2:
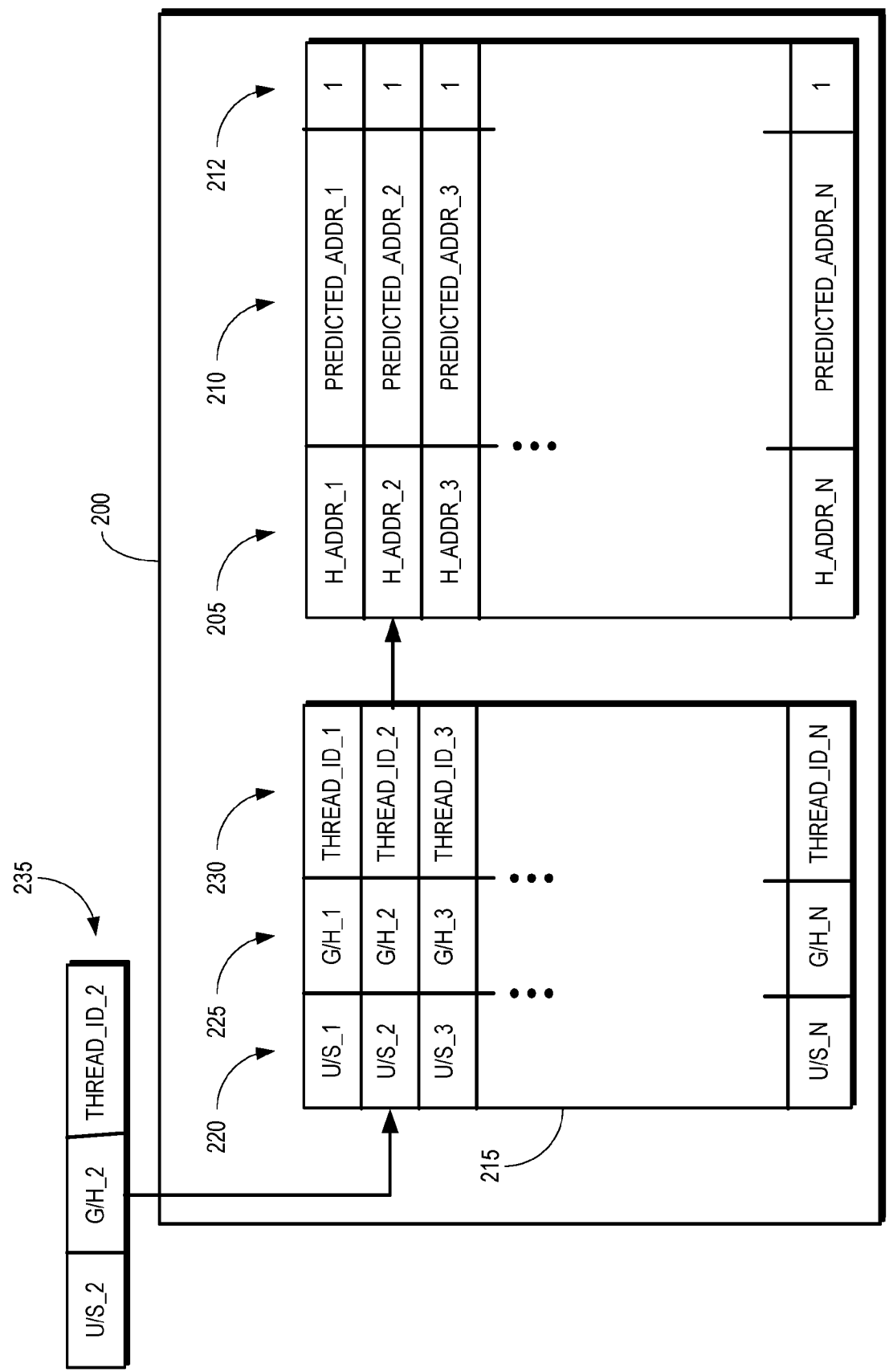
FIG. 2 is a block diagram of a branch prediction structure according to some embodiments.

FIG. 2 is a block diagram of a branch prediction structure 200 according to some embodiments. The branch prediction structure 200 is used to implement some embodiments of the branch prediction structure 120 shown in FIG. 1. Rows of the branch prediction structure 200 represent entries of the branch prediction structure 200. Indices that are used to select a row in the branch prediction structure 200 are known in the art and in the interest of clarity are not discussed in detail herein. Each row includes a first column 205 that stores information representing a hashed or unhashed value of an address of a branch instruction associated with the entry and a second column 210 that stores branch prediction information that is used to predict a destination address of the branch instruction. The branch prediction information 210 can contain information such as branch type in addition to the target address and is generated based on outcomes of processes that previously executed the branch instruction at the corresponding addresses 205. Some embodiments of the branch prediction structure 200 are implemented using content addressable memory to allow the entries in the branch prediction structure 200 to be accessed on the basis of the address of the branch instruction or the hashed value of the address. The branch prediction structure 200 also includes a third column 212 that stores a valid bit to indicate whether the corresponding entry includes valid information.

The entries in the branch prediction structure 200 are tagged using context tags 215 that are generated based upon context information for the processes that previously executed the branch instruction. In the illustrated embodiment, the tags are generated using information 220 indicating whether the process was a user process or a supervisor process, information 225 indicating whether the process was a guest process or a hypervisor process, and information 230 identifying a hardware thread used to execute the process. As discussed herein, the information 220, 225 is controlled by an operating system or a hypervisor and therefore cannot be faked or aliased by other processes. In some embodiments, the context tags 215 are generated by concatenating bit values representing the information 220, 225, 230 or by hashing the concatenated bit values.

In operation, a process executing on a processor core (or hardware thread) of the processing system is associated with a context tag 235 that is formed using context information associated with the process. The processor core encounters a branch instruction stored at an address that corresponds to a hashed value of an address (H_ADDR_2) stored in an entry of the branch prediction structure 200. The context tag 235 is compared to the context tag associated with the entry indicated by the hashed address value. In the illustrated embodiment, the context tag 235 matches the context tag associated with the entry. The processor core is therefore allowed to access the branch prediction information (column 210) for the entry. However, if the processor core attempted to access branch prediction information (column 210) for an entry associated with a context 220, 225, and 230 that does not match the context tag 235, the branch prediction structure 200 would deny the process access to the branch information contained therein.

Entries in the branch prediction structure 200 are flushed in response to a context switch between executing processes that operate with the same context tag. For example, in FIG. 2, entries in the branch prediction structure 200 are flushed in response to switching between two users by changing the CR3 value since the CR3 value is not part of the context tag. If switching between contexts that are represented by different context tags, such as from user to supervisor, the flush is not needed because the context tag denies access to branch predictor information that should not be shared. Some embodiments of the branch prediction structure 200 are configured to selectively flush entries in the branch predictor structure that are tagged with context tags that match the context tag corresponding to the context switch. An operating system can flush the branch prediction structure 200 to protect different users against each other on a context switch. A hypervisor can flush the branch prediction structure 200 to protect different guests against each other on a world switch. The flush functionality is triggered using a flush instruction or by writing to a machine specific register (MSR).

Some embodiments of the branch prediction structure 200 support accessing the valid bit 212 and context tags 215 as part of reads and writes to the branch prediction structure 200. In that case, flushes are slow because each entry is cleared individually or with a hardware state machine. Flash clearing the valid bits 212 makes the flush faster, but in that case the context tags 215 are only accessed as part of reads to the branch prediction structure 200. Some embodiments of the branch prediction structure support a fast full flush, but context-specific flushes are slow because each entry has to be cleared individually or with a hardware state machine. In some embodiments, context tags are accessed as content-addressable memory and the valid bits are flash cleared for all entries that match the context tag, which allows for fast full flush and fast context-specific flush. Some embodiments of the branch prediction structure split the thread identifier out from the context tag so the valid bit is separately flushable based on a thread identifier match.

Figure 3:
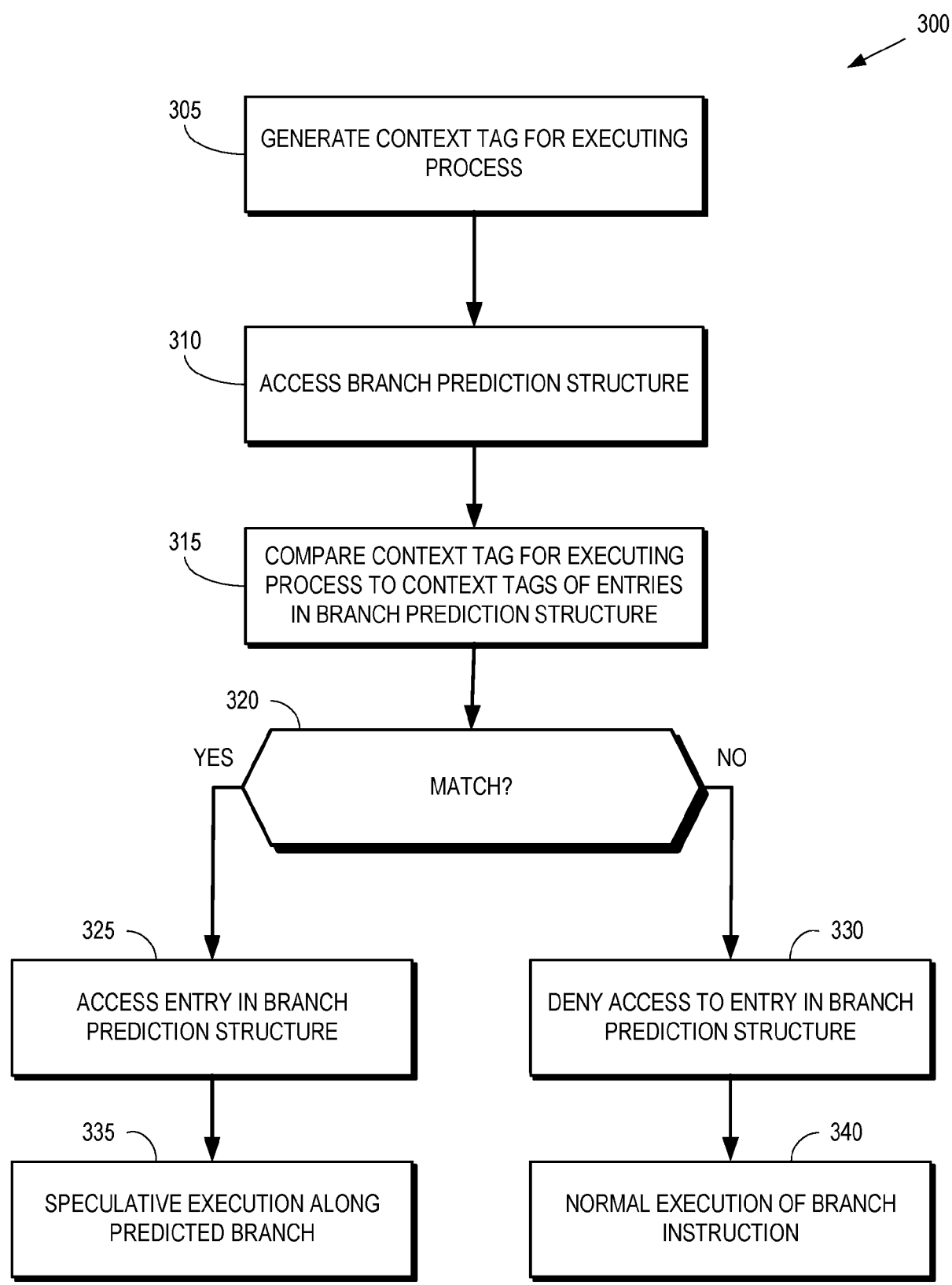
FIG. 3 is a flow diagram of a method of selectively providing access to entries in a branch prediction structure based on context tags according to some embodiments.

FIG. 3 is a flow diagram of a method 300 of selectively providing hardware access to entries in a branch prediction structure based on context tags according to some embodiments. The method 300 is implemented in some embodiments of the processing system 100 shown in FIG. 1 and in some embodiments of the branch prediction structure 200 shown in FIG. 2. In the illustrated embodiment, a process is executing or is allocated or scheduled for execution on one or more processor cores in a processing system such as the processor cores 101-103 in the processing system 100 shown in FIG. 1. As discussed herein, the processor cores that execute a process are referred to as the hardware thread that is allocated to execute the process. The hardware thread is identified by a thread identifier associated with the process that is executing on the hardware thread.

A context for the process is defined, at least in part, by context information that is controlled by an operating system (such as the operating system 120 shown in FIG. 1) or a hypervisor (such as the hypervisor 125 shown in FIG. 1). In some embodiments, the context information includes information indicating a privilege level for the process. Examples of information that indicate privilege levels include information indicating whether the process is a user process or a supervisor process. Some embodiments of the context information also include information indicating whether the process is a guest process or a hypervisor process for a virtual machine executing on the processing system, an address space identifier (ASID) that indicates a memory space associated with a virtual machine that is executing the process, a process context identifier (PCID) of the process, or a base address (CR3) of a page table associated with the process. Other types of context information can also be used to define the context for a process. For example, information used to restrict access to a Translation Lookaside Buffer (TLB) could also be used to determine the context for a process for the purposes of this invention. The thread identifier is also incorporated in the context information in some cases.

At block 305, a context tag is generated for the process. In some embodiments, the context tag is generated by concatenating bits representative of a subset of the context information that defines the context of the process. Incorporating larger amounts of context information into the context tag increases the granularity of context partitioning within a branch prediction structure. The process associated with the context tag executes on the processor core assigned to the process.

At block 310, the processor core accesses the branch prediction structure for the current address and one or more entries are read out from the branch prediction structure.

At block 315, the context tag for the executing process is compared to context tags for entries that were read out from the branch prediction structure in response to the process encountering the branch instruction. For example, the context tag for the executing process is compared to context tags for entries associated with a physical address, a virtual address, or a cache line address of the branch instruction. In some embodiments, the branch prediction structure is implemented as content addressable memory so that the context tag for the executing process is compared to the context tags stored in a table associated with the entries in the branch prediction structure.

At decision block 320, the branch prediction structure determines whether there is a match between the context tags for the executing process and one or more of the entries in the branch prediction structure. In some embodiments, the branch prediction structure determines whether there is a match based upon a result of logically ANDing a context tag for the executing process with a context tag in one or more of the entries in the branch prediction structure. In some embodiments, the branch prediction structure determines whether there is a match based upon a result of logically NANDing a context tag for the executing process with a context tag in one or more of the entries in the branch prediction structure. If so, the method 300 flows to block 325. If the context tag for the executing process does not match in the entries in the branch prediction structure, the method 300 flows to block 330.

At block 325, the processor core is permitted to access the entry in the branch prediction structure that includes branch prediction information for the branch instruction encountered by the process. Examples of branch prediction information include a predicted destination address for the branch instruction, a value of a saturating counter that indicates relative likelihoods of different outcomes of the branch instruction, and the like. In some cases, the branch prediction structure can hold different sub-structures that are tagged with context tag and the method 300 can therefore be permitted access to only the sub-structures for which there was a match. At block 335, the process is speculatively executed along a branch predicted by the branch prediction information. For example, the branch prediction information in the accessible entry is available to a fetch unit (such as the fetch unit 125 shown in FIG. 1B), which predicts a destination address for the branch instruction and begins fetching instructions along the predicted branch for decoding, scheduling, and execution.

At block 330, the processor core is denied access to the entry in the branch prediction structure due to the mismatch between the context tag for the process and the context tag that is used to tag the entry. Denying access to the entry based on the context tag mismatch enforces context partitioning and prevents inadvertent or intentional aliasing between different processes attempting to access entries in the branch prediction structure. At block 340, the process continues fetching down the sequential path and performs normal execution of the branch instruction without benefit of branch prediction information included in one or more entries of the branch prediction structure.

Figure 4:
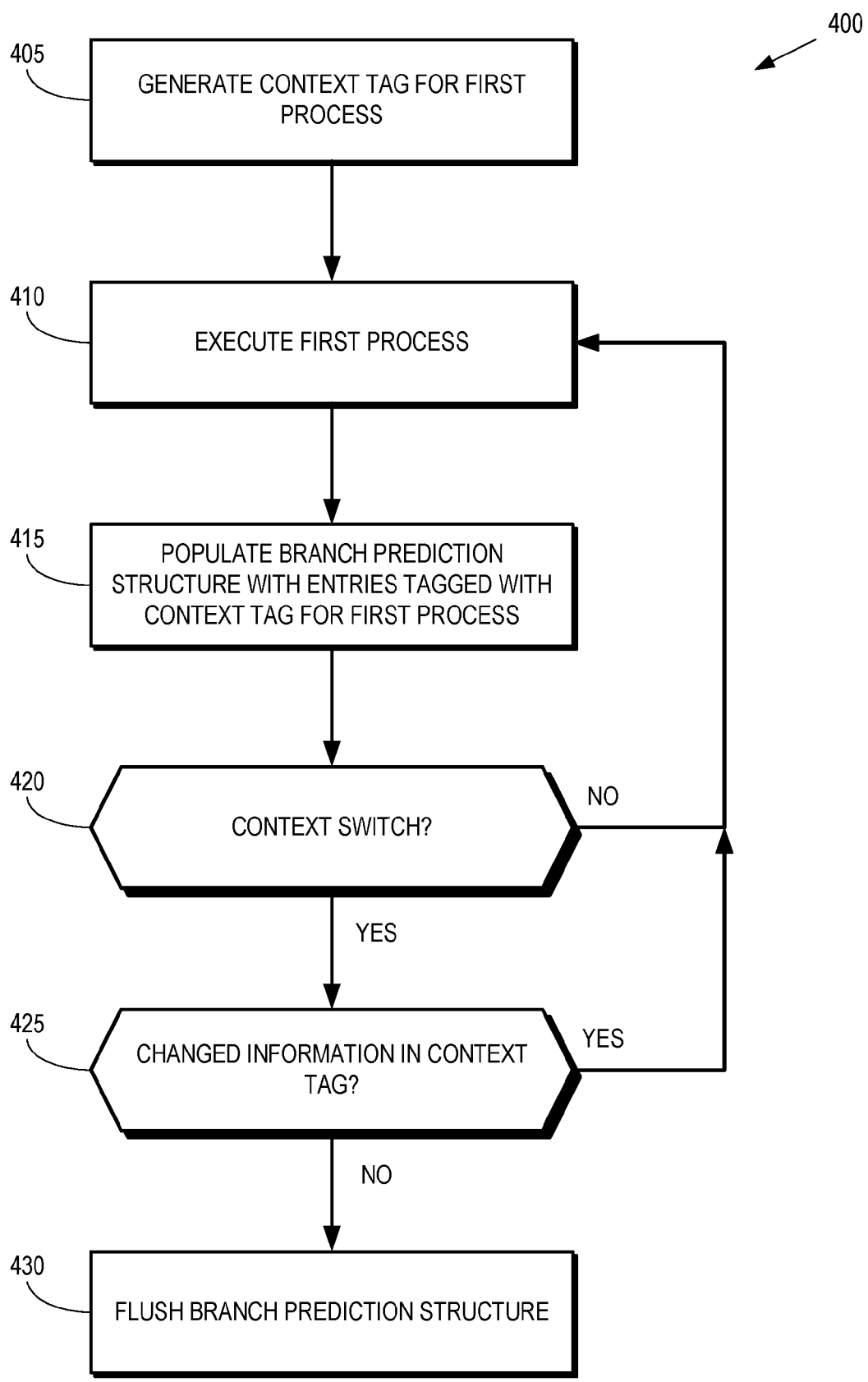
FIG. 4 is a flow diagram illustrating a method of populating and flushing entries in a branch prediction structure according to some embodiments.

FIG. 4 is a flow diagram illustrating a method 400 of populating and flushing entries in a branch prediction structure according to some embodiments. The method 400 is implemented in some embodiments of the processing system 100 shown in FIG. 1 and in some embodiments of the branch prediction structure 200 shown in FIG. 2. In the illustrated embodiment, a first process is allocated or scheduled for execution on one or more processor cores in a processing system such as the processor cores 101-103 in the processing system 100 shown in FIG. 1. The first process is associated with a thread identifier and context information is controlled by an operating system or a hypervisor, as discussed herein.

At block 405, a context tag is generated for the first process. At block 410, the processing system begins executing the first process by executing instructions in a program flow.

At block 415, the processing system populates entries in a branch prediction structure with entries that are tagged with the context tag for the first process. For example, entries in the branch prediction structure are generated in response to the process executing branch instructions in the program flow. Each entry is indexed by an address (physical, virtual, or cache line) of the branch and structure and is tagged using the context tag of the first process. Some embodiments of the branch prediction structure use additional information for both the index and tag, such as the address, branch history, other program state, or a hashed value of one or a combination of the aforementioned values. Branch prediction information is generated based on an outcome of the branch instruction, e.g., based on a destination address generated by the branch instruction or a result of a condition that is evaluated to determine an outcome of a conditional branch instruction. The branch prediction information is then stored in a field of the entry in the branch prediction structure. In some embodiments, branch prediction information for a current execution of a branch instruction is combined with outcomes of previous executions of the branch instruction to generate the branch prediction information in an entry.

At decision block 420, the processing system determines whether there has been a context switch. Examples of context switches include a context switch between two user processes or a world switch between two guest processes on a virtual machine, a system call from user to supervisor code, or a change to a process context by writing its page table base address (CR3). As long as a context switch has not been performed, the method 400 continues to execute the process at block 410 and populate the branch prediction structure at block 415. If the processing system determines that a context switch has been performed, e.g., between the first process and a second process, the method flows to decision block 425.

At decision block 425, the processing system determines whether the context switch changed context information that was not included in the context tag. If the change is for information that was included in the context tag, the method 400 continues to execute the process at block 410. Otherwise, the method flows to block 430. For example, if the context tag did not include the CR3 value and the context switch was due to a change in CR3 the method would flow to block 430.

At block 430, the branch prediction structure is flushed in response to the context switch. In some embodiments, all of the entries in the branch prediction structure are flushed in response to a context switch between two different processes. In other embodiments, a subset of the entries in the branch prediction structure are flushed in response to the context switch. For example, only entries in the branch prediction structure that are tagged with a context tag that matches the context tag of the first process are flushed in response to the context switch from the first process to the second process. In some embodiments, a thread identifier is treated separately from the remainder of the context tag to support flushing entries in the branch prediction structure on a thread-by-thread basis, e.g., only entries for the thread associated with a thread identifier are flushed. In some embodiments, a mechanism such as a new instruction is provided for the process to trigger a flush. This can be used if the process caused a context switch that the hardware method is incapable of detecting or if the process requires additional partitioning.

Figure 5:
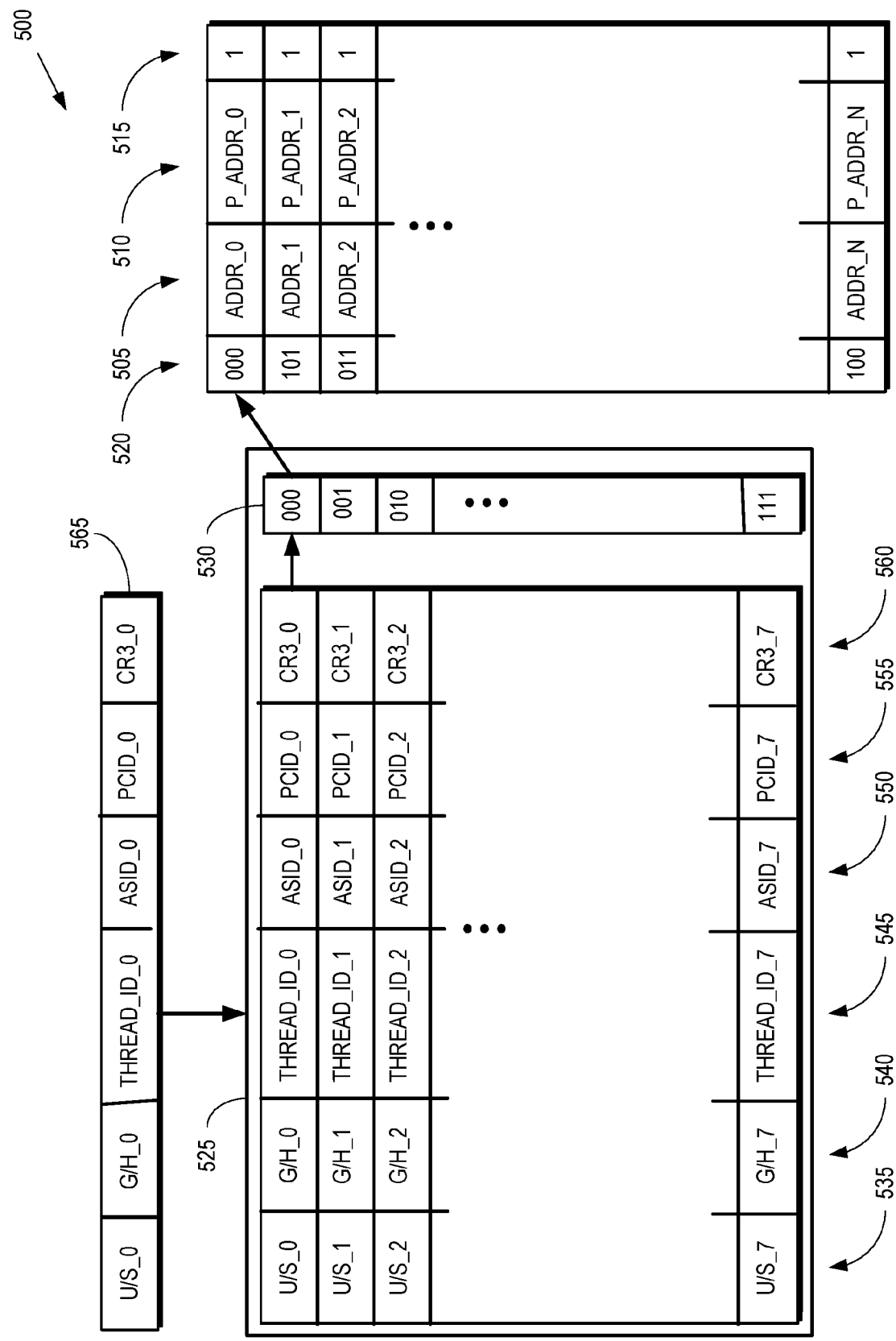
FIG. 5 is a block diagram of a branch prediction structure that includes a context remapper to map context information to context tags according to some embodiments.

FIG. 5 is a block diagram of a branch prediction structure 500 that includes a context remapper to map context information to context tags according to some embodiments. The branch prediction structure 500 is used to implement some embodiments of the branch prediction structure 120 shown in FIG. 1. Rows of the branch prediction structure 500 represent entries of the branch prediction structure 500. Each row includes a first column 505 that stores information representing a value (potentially hashed) of an address of a branch instruction associated with the entry and a second column 510 that stores branch prediction information that is used to predict a destination address and other characteristics of the branch instruction. The branch prediction information 510 is generated based on outcomes of processes that previously executed the branch instruction at the corresponding addresses (column 505). Some embodiments of the branch prediction structure 500 are implemented using content addressable memory to allow the entries in the branch prediction structure 500 to be accessed based on the address of the branch instruction or the hashed value of the address. Some embodiments of the branch predictor structure 500 also include branch history information or other program state as part of the information used to index and/or tag the structure. The branch prediction structure 500 also includes a third column 515 that stores a valid bit to indicate whether the corresponding entry includes valid information.

Entries in the branch prediction structure 500 are tagged with context tags (in column 520) formed of a predetermined number of bits. In the illustrated embodiment, the context tags are represented by values of three bits. However, more or fewer bits are used to represent more or fewer context tags in other embodiments. Each of the context tags in column 520 are mapped to different contexts that are associated with the processes that were used to generate the branch prediction information in column 520 of the corresponding entry.

A context remapper 525 is used to map context information for processes to specific context tags that are used in the branch prediction structure 500. Rows in the context remapper 525 are associated with different values of the context tags. In the illustrated embodiment, the values of the context tags are stored in the column 530. However, a separate column 530 is not always necessary to store the values of the context tags. Instead, in some embodiments the value of a context tag associated with context information in an entry of the context remapper 525 is inferred from the position of the entry within the context remapper 525. For example, the first entry in the context remapper 525 can have an inferred value of the context tag equal to 000. Column 535 of the context remapper 525 includes one or more bits indicating a user/supervisor mode, column 540 includes one or more bits indicating a guest/hypervisor mode, column 545 includes one or more bits indicating a thread identifier, column 550 includes one or more bits indicating an ASID, column 555 includes one or more bits indicating a PCID, column 560 includes one or more bits indicating a CR3 value. However, some embodiments of the context remapper 525 are used to map more or less context information to the context tags. Generating context tags using the context remapper 525 allows context partitioning at finer granularity (e.g., using more context information) without consuming significant storage in the context tags (column 520) that are used to tag entries in the branch prediction structure 500.

In operation, a process executing on the processing system encounters a branch instruction stored at an address that corresponds to a value of an address (ADDR_0) stored in an entry of the branch prediction structure 500. Context information 565 for the process is compared to context information stored in the context remapper 525, which maps the context information 565 to a context tag. In the illustrated embodiment, the context remapper 525 maps the context information 565 to the context tag 000. The context tag for the process is compared to the context tag associated with the entry indicated by the address value. In the illustrated embodiment, the context tag for the process matches the context tag associated with the entry. The processor core is therefore allowed to access the branch prediction information 510 for the entry. However, if the processor core attempted to access branch prediction information 510 for an entry associated with a different hashed address value (e.g., ADDR_2), the branch prediction structure 500 would deny the processor core access to the branch information 510 because the context tag for the process does not match the context tag associated with the entry.

In some embodiments, a context tag for the executing process is generated once in response to a change in the context information for an executing process. The new context information for the process is compared to context information stored in the context remapper 525, e.g., by comparing the context information 565 to values in the columns 535, 540, 545, 550, 555, 560. In response to a match, the context tag associated with the matching context information is stored as the current context tag. If none of the context information for entries in the context remapper 525 match the context information of the executing process, a new entry is allocated and the context information of the executing process is mapped to that new context tag, which is then stored as the current context tag. If the context tag for the newly allocated entry was previously used, entries in the branch prediction structure 500 that were tagged with the context tag are invalidated, e.g., by modifying a value of the corresponding valid bit in the column 515, or by writing a predetermined value to the entry if no valid bit exists. Previous entries in the context remapper 525 are evicted based on a replacement policy if all of the context tags have been allocated.

Figure 6:
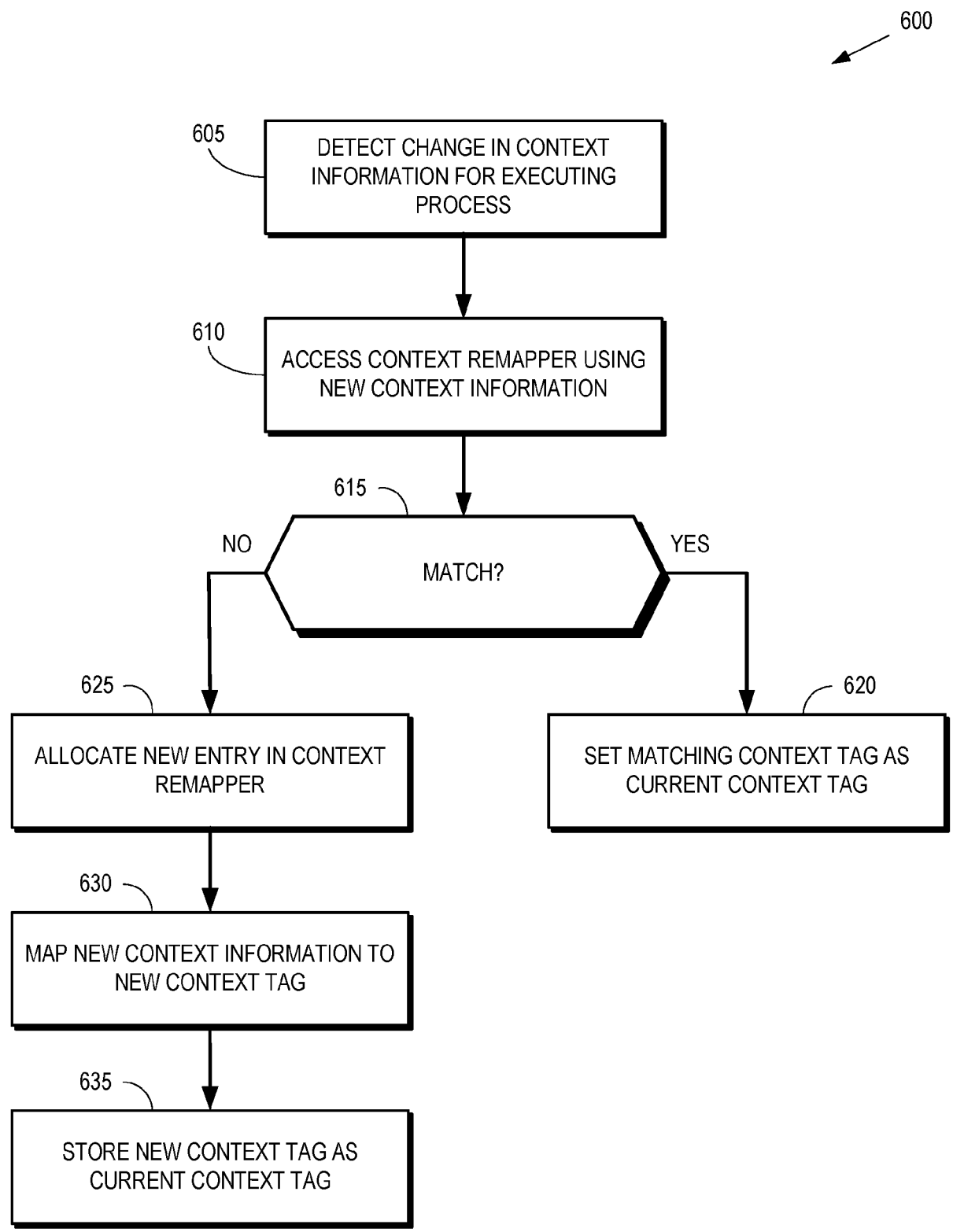
FIG. 6 is a flow diagram of a method of selectively providing access to entries in a branch prediction structure based on context tags generated by a context remapper according to some embodiments.

FIG. 6 is a flow diagram of a method 600 of selectively providing hardware access to entries in a branch prediction structure based on context tags generated by a context remapper according to some embodiments. The method 600 is implemented in some embodiments of the processing system 100 shown in FIG. 1 and in some embodiments of the branch prediction structure 500 shown in FIG. 5. In the illustrated embodiment, a process is executing or is allocated or scheduled for execution on one or more processor cores in a processing system such as the processor cores 101-103 in the processing system 100 shown in FIG. 1. As discussed herein, the processor cores that execute a process are referred to as a hardware thread, which is identified by a thread identifier. A context for the process is defined, at least in part, by context information that is controlled by an operating system (such as the operating system 120 shown in FIG. 1) or a hypervisor (such as the hypervisor 125 shown in FIG. 1).

At block 605, the processing system detects a change in the context information associated with an executing process. The change in the context information is caused by a context switch from one process to another or by a single process causing a change to its own context information.

At block 610, the processing system accesses a context remapper (such as the context remapper 525 shown in FIG. 5) based on the new context information. Some embodiments of the context remapper are implemented using content addressable memory, in which case the new context information is used as an index into the entries of the context remapper.

At decision block 615, the context remapper determines whether there is a match between the new context information and context information for one of the entries of the context remapper. If so, the method 600 flows to block 620. If the new context information does not match any existing context information in the context remapper, the method 600 flows to block 625.

At block 620, a current context tag for the executing process is set equal to a context tag in the entry of the context remapper that includes the matching context information.

At block 625, a new entry in the context remapper is allocated in response to the new context information not matching any existing context information in an entry of the context remapper. If the context remapper includes unallocated entries, one of the unallocated entries is allocated to the new context information. As discussed herein, the context remapper is able to allocate a predetermined number of context tags. If all of the context tags are allocated to other context information, an entry of the context remapper is evicted to make room for the new context information. As discussed herein, entries in branch prediction structures associated with the context tag of the evicted entry are flushed or invalidated in response to the eviction.

At block 630, the new context information is mapped to a context tag associated with the newly allocated entry. At block 635, the context tag associated with the newly allocated entry is then stored as the context tag for the currently executing process. Storing the context tag includes storing the context tag in a memory location or a register.

In some embodiments, the apparatus and techniques described above are implemented in a system including one or more integrated circuit (IC) devices (also referred to as integrated circuit packages or microchips), such as the branch prediction structures described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
generating, at a processor core of a processing system, a first context tag for a first process that is currently executing, based on context information controlled by an operating system or hypervisor of the processing system that is executing the first process, wherein the first context tag is generated using an indication representative of a privilege level for the first process, an indication of whether the first process is a guest process or a hypervisor process, and a thread identifier; and
selectively providing the processor core with access to an entry in a branch prediction structure of the processing system based on a comparison between the first context tag and a second context tag for the entry, wherein the second context tag is included in the branch prediction structure.

2. The method of claim 1, wherein the comparison is performed at the processor core.

3. The method of claim 1, wherein the selectively providing is based upon a result of logically ANDing the first context tag with the second context tag at the processor core.

4. The method of claim 1, wherein the selectively providing is based upon a result of logically NANDing the first context tag with the second context tag at the processor core.

5. The method of claim 1, wherein selectively providing the processor core with access to the entry comprises denying the processor core access to the entry in response to the first context tag differing from the second context tag.

6. The method of claim 1, wherein selectively providing the processor core with access to the entry comprises providing the processor core with access to the entry in response to the first context tag matching the second context tag.

7. The method of claim 6, further comprising:
predicting a destination address for a branch instruction based on branch prediction
information in the entry of the branch prediction structure; and
speculatively executing an instruction at the destination address.

8. The method of claim 1, wherein the second context tag has been previously stored in the branch prediction structure based on process context information for a previous execution of a branch instruction associated with the entry.

9. The method of claim 1, wherein the context information controlled by the operating system or hypervisor of the processing system that is executing the first process comprises an indication whether the first process is a guest process or a hypervisor process for a virtual machine executing on the processing system.

10. The method of claim 1, wherein the context information controlled by the operating system or hypervisor of the processing system that is executing the first process comprises an address space identifier (ASID) that indicates a memory space associated with a virtual machine that is executing the first process.

11. The method of claim 1, wherein generating the first context tag comprises mapping the context information to first values of a predetermined number of bits that represent the first context tag.

12. The method of claim 11, wherein mapping the context information to the first values of the predetermined number of bits comprises comparing the context information to previously stored context information in an entry of a context remapper.

13. The method of claim 12, wherein mapping the context information to the first values of the predetermined number of bits comprises setting the first values of the predetermined number of bits equal to previously stored values associated with the previously stored context information in response to the context information matching the previously stored context information in the entry of the context remapper.

14. The method of claim 12, wherein mapping the context information to the first values of the predetermined number of bits comprises allocating a new entry in the context remapper in response to the context information failing to match the previously stored context information in any entries of the context remapper.

15. The method of claim 14, wherein mapping the context information to the first values of the predetermined number of bits comprises mapping the context information to a new set of values of the predetermined number of bits that are associated with the new entry in the context remapper.

16. The method of claim 15, further comprising:

evicting a previous entry in the context remapper in response to all entries in the context remapper being allocated.

17. The method of claim 11, wherein the second context tag is represented by second values of the predetermined number of bits, and wherein the second values are generated based on context information of previously executed processes that were used to generate branch prediction information in the entry.

18. The method of claim 1, wherein the first context tag is generated by concatenating the indication representative of the privilege level for the first process, the indication of whether the first process is a guest process or a hypervisor process, and the thread identifier.

19. A processing system comprising:
a processor core configured to execute a first process, wherein the first process is associated with a first context tag that is generated during execution of the first process, based on context information controlled by an operating system or hypervisor of the processing system, wherein the first context tag is generated using an indication representative of a privilege level for the first process, an indication of whether the first process is a guest process or a hypervisor process, and a thread identifier; and
a branch prediction structure configured to selectively provide the processor core with access to an entry in the branch prediction structure based on a comparison between the first context tag and a second context tag for the entry, the second context tag included in the branch prediction structure.

20. The processing system of claim 19, wherein the comparison is performed at the processor core.

21. The processing system of claim 19, wherein the branch prediction structure selectively provides the processor core with access to the entry based upon a result of logically ANDing the first context tag with the second context tag at the processor core.

22. The processing system of claim 19, wherein the branch prediction structure selectively provides the processor core with access to the entry based upon a result of logically NANDing the first context tag with the second context tag at the processor core.

23. The processing system of claim 19, wherein the branch prediction structure is configured to deny the processor core access to the entry in response to the first context tag differing from the second context tag.

24. The processing system of claim 19, wherein the branch prediction structure is configured to provide the processor core with access to the entry in response to the first context tag matching the second context tag.

25. The processing system of claim 24, wherein the processor core is configured to predict a destination address for a branch instruction based on branch prediction information in the entry of the branch prediction structure and speculatively execute an instruction at the destination address.

26. The processing system of claim 19, wherein the second context tag has been previously stored in the branch prediction structure based on process context information for a previous execution of a branch instruction associated with the entry.

27. The processing system of claim 19, wherein the context information for the first process comprises an indication whether the first process is a guest process or a hypervisor process for a virtual machine executing on the processing system.

28. The processing system of claim 19, wherein the context information for the first process comprises an address space identifier (ASID) that indicates a memory space associated with a virtual machine that is executing the first process.

29. The processing system of claim 19, further comprising:
a context remapper that maps the context information to first values of a predetermined number of bits that represent the first context tag.

30. The processing system of claim 29, wherein the context information is mapped to the first values of the predetermined number of bits by comparing the context information to previously stored context information in an entry of the context remapper.

31. The processing system of claim 30, wherein the context information is mapped to the first values of the predetermined number of bits by setting the first values of the predetermined number of bits equal to previously stored values associated with the previously stored context information in response to the context information matching the previously stored context information in the entry of the context remapper.

32. The processing system of claim 30, wherein the context remapper is configured to allocate a new entry in response to the context information failing to match the previously stored context information in any entries of the context remapper.

33. The processing system of claim 32, wherein the context remapper is configured to map the context information to a new set of values of the predetermined number of bits that are associated with the new entry.

34. The processing system of claim 33, wherein the context remapper is configured to evict a previous entry in response to all entries in the context remapper being allocated.

35. The processing system of claim 29, wherein the second context tag is represented by second values of the predetermined number of bits, and wherein the second values are generated based on context information of previously executed processes that were used to generate branch prediction information in the entry.

36. The processing system of claim 19, wherein the first context tag is generated by concatenating the indication representative of the privilege level for the first process, the indication of whether the first process is a guest process or a hypervisor process, and the thread identifier.

* * * * *